United States Patent
Ponnarasu

(10) Patent No.: US 10,444,899 B2
(45) Date of Patent: Oct. 15, 2019

(54) MULTIPLE THRESHOLD MOTION TOLERANCE TO FILTER COORDINATE JITTER IN TOUCH SENSING

(71) Applicant: STMicroelectronics Asia Pacific Pte Ltd, Singapore (SG)

(72) Inventor: Manivannan Ponnarasu, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 102 days.

(21) Appl. No.: 15/412,824

(22) Filed: Jan. 23, 2017

(65) Prior Publication Data

US 2018/0210607 A1 Jul. 26, 2018

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2006/0019752 A1* | 1/2006 | Ohta .................... | G06F 3/0488 463/43 |
| 2010/0117962 A1* | 5/2010 | Westerman ......... | G06F 3/03543 345/163 |
| 2011/0285636 A1* | 11/2011 | Howard .............. | G06F 3/04815 345/173 |
| 2014/0240293 A1* | 8/2014 | McCaughan ......... | G06F 3/0304 345/175 |
| 2014/0298266 A1* | 10/2014 | Lapp ................... | G06F 3/04883 715/835 |

* cited by examiner

*Primary Examiner* — Matthew Yeung
(74) *Attorney, Agent, or Firm* — Crowe & Dunlevy

(57) ABSTRACT

A touch screen controller includes input circuitry receiving touch data from a touch screen, and processing circuitry. The processing circuitry determines first coordinates of a touch at a first time, based upon the received touch data. A first threshold window is set about the first coordinates, with the first threshold window having a central point at the first coordinates, and a second threshold window is set about the first coordinates, with the second threshold window having a central point at the first coordinates and being larger than the first threshold window. Second coordinates of the touch are determined at a second time, based upon the received touch data, and where the second coordinates are not within the first threshold window but are within the second threshold window, the second coordinates are corrected based upon a distance between the second coordinates and the central point of the second threshold window.

24 Claims, 4 Drawing Sheets

MULTIPLE THRESHOLD MOTION TOLERANCE TO FILTER COORDINATE JITTER IN TOUCH SENSING

TECHNICAL FIELD

This application is directed to the field of finger sensing, and, more particularly, to the use of multiple threshold motion tolerance to filter coordinate jitter when determining coordinates of a touch.

BACKGROUND

Touch screens are prevalent in today's computing environment. Portable computers, desktop computers, tablets, smart phones, and smartwatches employ a touch screen to gain user input for navigation and control of these devices. Thus, discerning the intent of the user via touch inputs becomes an important feature of a touch screen device.

However, due to the different gestures, long touches, force touches, and other ways in which a user may interact with a modern touch screen device, it is important to not only determine the initial location of an individual touch, but to accurately track the position of the touch input to the screen during a gesture, long touch, force touch, and the like.

Noise becomes a particular problem in this endeavor. Internal noise from components of the touch screen device, such as the display technology itself (i.e. LCD, AMOLED, etc), may lead to coordinate "jitter", that is, fluctuations in the touch data used to determine the coordinates of a touch, causing the resulting determined coordinates to fluctuate. External noise, from EMI emitting devices such as LED lights and cook tops, may also lead to such coordinate jitter. In addition, charger noise introduced when the touch screen device is being charged, may itself also lead to coordinate jitter.

This coordinate jitter is highly undesirable, and can lead to an unsatisfactory user experience. Existing filtering techniques may be insufficient to reduce or eliminate this coordinate jitter. Therefore, further development of techniques to reduce or eliminate coordinate jitter is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a touch screen controller operable with a touch screen. The touch screen controller includes input circuitry configured to receive touch data from the touch screen, and processing circuitry. The processing circuitry is configured to determine first coordinates of a touch to the touch screen at a first time, based upon the received touch data. The processing circuitry is also configured to set a first threshold window about the first coordinates, with the first threshold window having a central point at the first coordinates, and set a second threshold window about the first coordinates, with the second threshold window having a central point at the first coordinates and being larger than the first threshold window. The processing circuitry is further configured to determine second coordinates of the touch at a second time, based upon the received touch data, and where the second coordinates are not within the first threshold window but are within the second threshold window, correct the second coordinates based upon a distance between the second coordinates and the central point of the second threshold window.

The processing circuitry may be further configured to, where the second coordinates are within the first threshold window, correct the second coordinates based upon a distance between the second coordinates and the central point of the first threshold window.

The processing circuitry may be further configured to, where the second coordinates are not within the first threshold window but are within the second threshold window, update the first threshold window as a function of the second coordinates.

The processing circuitry may update the first threshold window by moving a location of the central point of the first threshold window as a function of the second coordinates. In some cases, the processing circuitry may the location of the central point of the first threshold window by setting the location of the central point of the first threshold window such that the second coordinates are outside of, but immediately adjacent to, the first threshold window after moving of the central point thereof. In some cases, the processing circuitry may move the location of the central point of the first threshold window by setting the location of the central point of the first threshold window such that the second coordinates are at a perimeter of the first threshold window after moving of the central point thereof.

The processing circuitry may update the first threshold window without changing a size thereof.

The processing circuitry may be further configured to, where the second coordinates are not within the first threshold window and not within the second threshold window, correct the second coordinates based upon a distance between the second coordinates and the first coordinates.

The processing circuitry, where the second coordinates are not within the first threshold window and not within the second threshold window, may correct the second coordinates based upon the distance between the second coordinates and the first coordinates divided by an elapsed time between the first time and the second time.

The processing circuitry may be further configured to, where the second coordinates are not within the first threshold window and not within the second threshold window, update the second threshold window as a function of the second coordinates.

The processing circuitry may update the second threshold window by moving a location of the central point of the second threshold window as a function of the second coordinates.

The processing circuitry may move the location of the central point of the second threshold window by setting the location of the central point of the second threshold window such that the second coordinates are outside of, but immediately adjacent to, the second threshold window after moving of the central point thereof.

The processing circuitry may move the location of the central point of the second threshold window by setting the location of the central point of the second threshold window such that the second coordinates are at a perimeter of the second threshold window after moving of the central point thereof.

The processing circuitry may update the second threshold window without changing a size thereof.

The processing circuitry may be further configured to, where the second coordinates are within the first threshold window, correct the second coordinates to match the central point of the first threshold window.

Also disclosed herein is a method aspect. The method includes receiving touch data from a touch screen, and determining first coordinates of a touch to the touch screen at a first time, based upon the received touch data. The method also includes setting a first threshold window about the first coordinates, with the first threshold window having a central point at the first coordinates, and setting a second threshold window about the first coordinates, with the second threshold window having a central point at the first coordinates and being larger than the first threshold window. The method further includes determining second coordinates of the touch at a second time, based upon the received touch data, and where the second coordinates are not within the first threshold window but are within the second threshold window, correcting the second coordinates based upon a distance between the second coordinates and the central point of the second threshold window.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
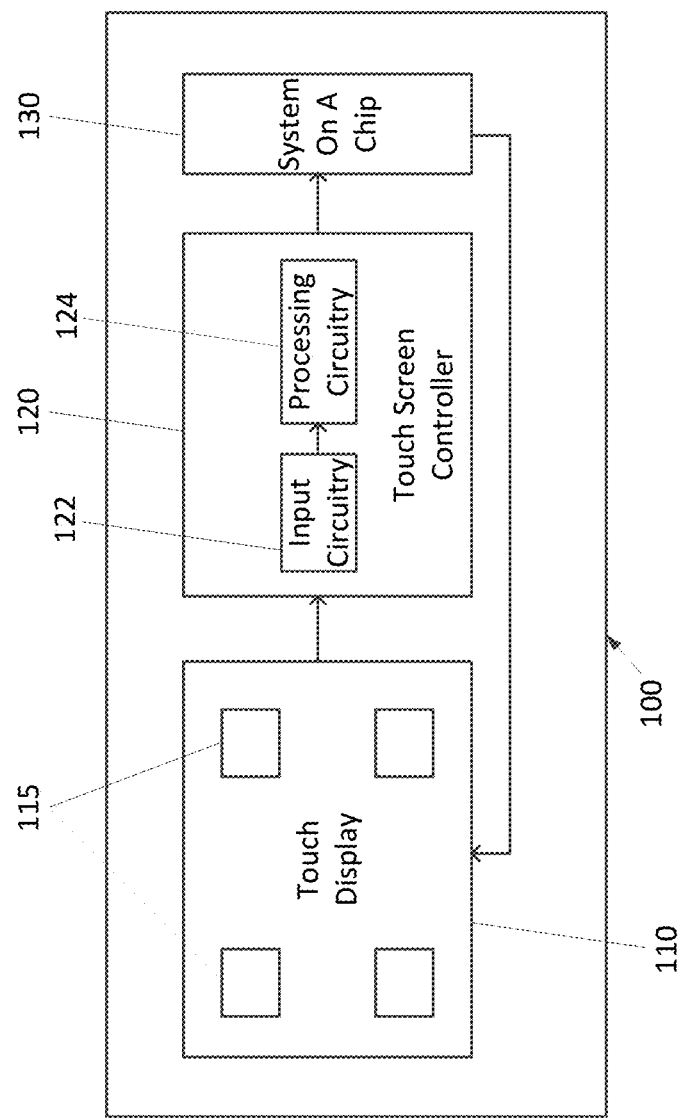
FIG. 1 is a block diagram of a touch screen device in accordance with this disclosure.

FIG. 1 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch display 110, coupled to a touch controller 120. The touch screen display 110 is designed to receive touch inputs from a user through a user's fingers or a stylus. The touch screen display 110 includes touch screen sensors 115 that are configured to detect touches (or other input actions such as hover or gesture motions) to the touch screen display 110. As a touch is sensed, the touch screen controller 120 may receive touch signals from the sensors 115 and analyze the touch signal(s). This analysis produces coordinates of the received touch. These coordinates may then be used by a system on a chip (SOC) 130 to manipulate operations respect to applications and programs executing on the touch screen device 100.

In one embodiment, the sensors 115 may be of a single type of sensing technology or sensor, such as self-capacitance sensors or mutual capacitance sensors, to be utilized in the touch screen device 100 to detect input events. In some cases, the same sensors 115 may be used for both self-capacitance sensing and mutual capacitance sensing.

Where the sensors 115 are capacitive sensors, the sensors 115 are typically formed as an array of sensors from transparent patterned orthogonal conductive lines (not shown) formed on the surface, or integrated as part of, the touch display 110. The intersections of the conductive lines form the individual touch sensors 115, and the touch screen controller 120 scans these sensing points and processes the generated signals to identify the location and type of a touch point or points. Thus, the touch screen display 110 may be considered as a touch map having XY coordinates wherein several touch regions (as defined by a set of XY coordinates) of possible touch information may be generated based on one or more touches to the touch screen display 110. The coordinates generated above are XY coordinates identifying the location of the touch on the touch display 110.

Figure 2:
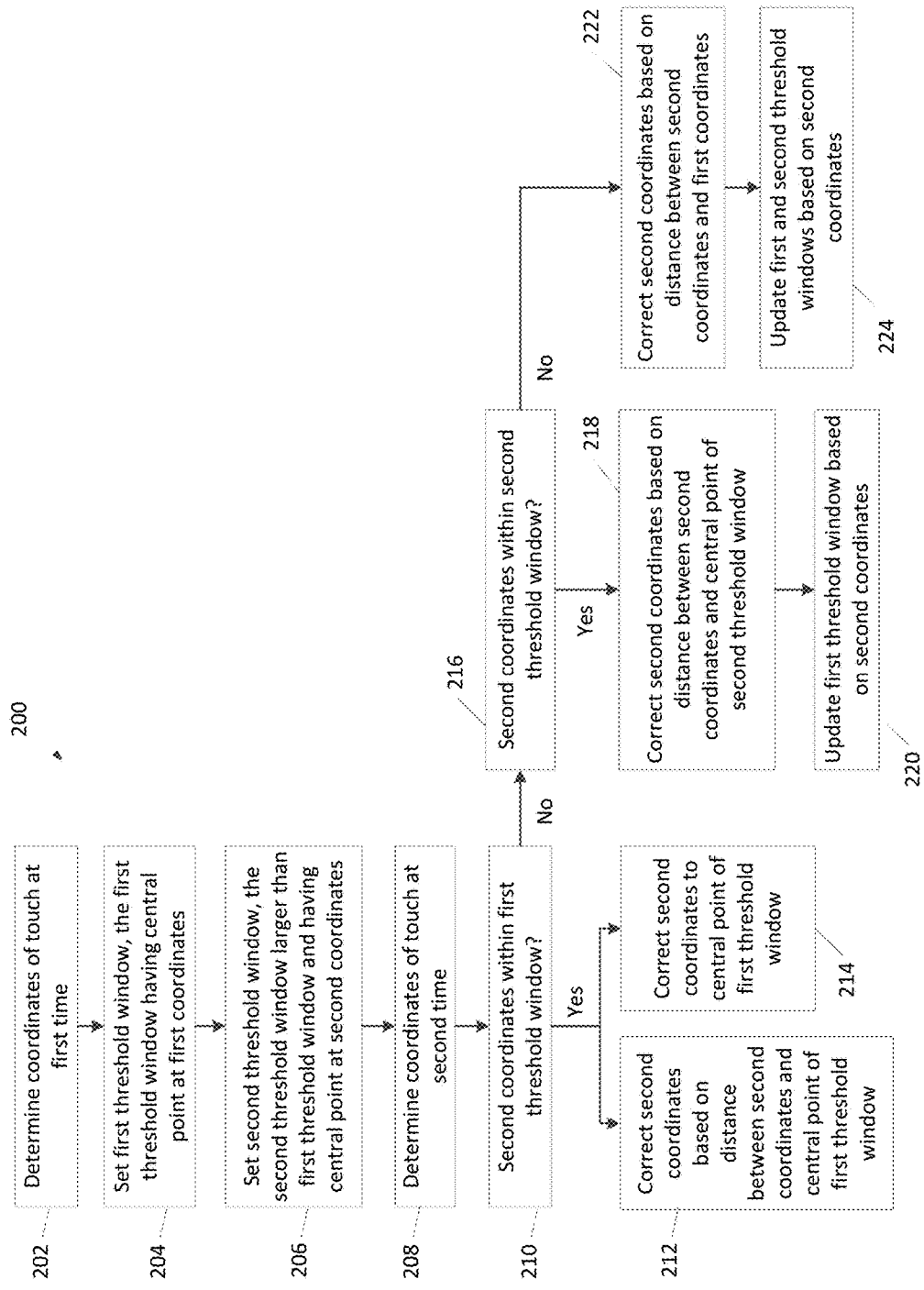
FIG. 2 is a flowchart of a method of operating the touch screen device of FIG. 1 in accordance with this disclosure.

With initial reference to flowchart 200 of FIG. 2, operation of the touch screen controller 120 is now described. Initially, input circuitry 122 of the touch screen controller 120 receives touch data at a first time from the touch display 110, and processing circuitry 124 of the touch screen controller 120 determines first coordinates of the touch 50 at the first time (Block 202).

The processing circuitry 124 then generates a first threshold window 54 about the coordinates 60 of the first touch, with the first threshold window 54 having a central point 51 at the first coordinates 60 (Block 204). The processing circuitry 124 also generates a second threshold window 56 about the first coordinates 60, with the second threshold window 56 having a central point 52 at the first coordinates 60 (Block 206). These first and second threshold windows 54, 56 can be seen in FIG. 3, with R1 representing the radius of the first threshold window, and R2 representing the radius of the second threshold window. The second threshold window 56 is generated as being larger than the first threshold window 54, and encircles the first threshold window 54. Although the threshold windows 54, 56 are shown as being circular, other window shapes such as rectangles or squares may be used in some applications.

Figure 4:
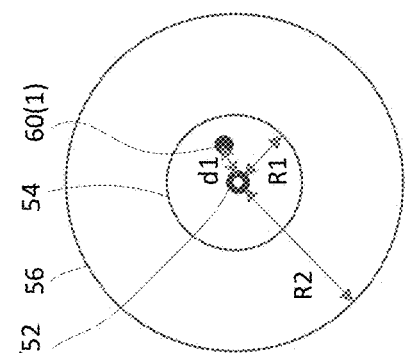
FIG. 4 shows the movement of the touch coordinates within the first movement threshold, pursuant to the operation described in the flowchart of FIG. 2.
Figure 3:
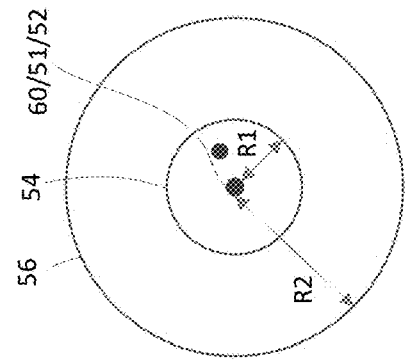
FIG. 3 shows the determination of a touch coordinate and the generation of first and second movement thresholds, pursuant to the operation described in the flowchart of FIG. 2.

The processing circuitry 124 then determines second coordinates 60(1) of the touch at a second time (Block 208) after the first time. If the second coordinates 60(1) are within the first threshold window 54 (Block 210), as shown in FIG. 3, the first and second threshold windows 54, 56 and their central points 51, 52 remain unadjusted and unchanged, as shown in the example of FIG. 4. Here, the second coordinates 60(1) may then be corrected or filtered by the processing circuitry 124 based on the distance d1 between the second coordinates 60(1) and the central point 51 of the first threshold window 54 (Block 212), or corrected to be the central point 51 of the first threshold window 54 (Block 214). By corrected or filtered here, it is understood that the coordinates themselves may be filtered, or the touch data used in generating the filters may be filtered and the coordinates then recalculated.

This filtering may be performed using an infinite impulse response filter, and the coefficients thereof may be based on the second coordinates 60(1) being within the first threshold window 54, or based upon the distance d1 between the second coordinates 60(1) and the central point 51 of the first threshold window 54.

Figure 5:
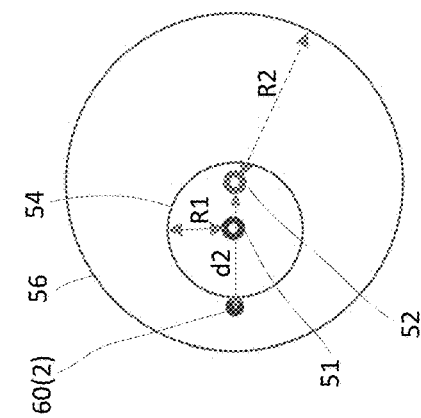
FIG. 5 shows the movement of the touch coordinates outside of the first movement threshold but within the second movement threshold, pursuant to the operation described in the flowchart of FIG. 2.

If the second coordinates 60(2) were not within the first threshold window 54, but are within the second threshold window 56 (Block 216), as shown in the example of FIG. 5, then the second coordinates 60(2) may be corrected or filtered by the processing circuitry 124 based upon the distance d2 between the second coordinates 60(2) and the central point 52 of the second threshold window 56 (Block 218).

This filtering may be performed using an infinite impulse response filter, and the coefficients thereof may be based on the second coordinates 60(2) being within the second threshold window 56, or based upon the distance d2 between the second coordinates 60(2) and the central point 52 of the second threshold window 56.

In addition, here the location of the first threshold window 54 is updated based on the second coordinates 60(2), prior to correction or filtering thereof (Block 220), as also shown in FIG. 5. The update is to move the location of the central point 51 of the first threshold window 54, while keeping the size of the first threshold window the same. The new location of the central point 51 of the first threshold window 54 is moved such that the second coordinate 60(2) is immediately adjacent to, but not inside of, the first threshold window 54, or in some cases, such that the second coordinate 60(2) is located at a portion of the perimeter of the first threshold window 54 as moved or adjusted. The new coordinates of the central point 51 will be calculated as (x−R1, y−R1) or (x+R1,y+R1), dependent on the direction in which the second coordinates 60(2) have moved compared to the first coordinates 60.

Figure 6:
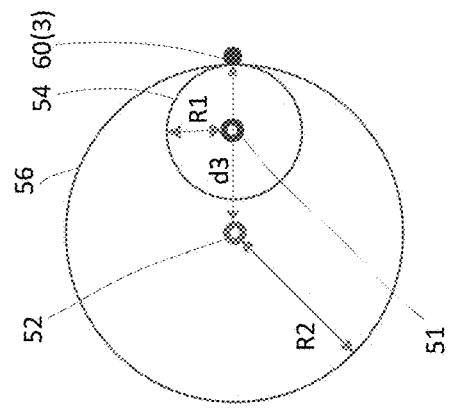
FIG. 6 shows the movement of the touch coordinates outside of the first and second movement thresholds, pursuant to the operation described in the flowchart of FIG. 2.

If the second coordinates 60(3) were not within the first threshold window 54, and were also not within the second threshold window 56, as shown in FIG. 6, then the second coordinates 60(3) may be corrected or filtered by the processing circuitry 124 based upon the distance d3 between the second coordinates 60(3) and the first coordinates 60 (Block 222), as shown in FIG. 6. In some instances, the second coordinates 60(3) are corrected or filtered by the processing circuitry 124 based upon the distance d3 between the second coordinates 60(3) and the first coordinates 60, divided by the elapsed time between the first and second time. The first and second threshold windows 54, 56 are then updated based upon the second coordinates 60(3) prior to correction or filtering thereof (Block 224).

The new coordinates of the central point 51 will be calculated as (x−R1,y−R1) or (x+R1,y+R1), dependent on the direction in which the second coordinates 60(3) have moved compared to the first coordinates 60. The new coordinates of the central point 52 will be calculated as (x−R2,y−R2) or (x+R2,y+R2), dependent on the direction in which the second coordinates 60(3) have moved compared to the first coordinates 60.

This filtering may be performed using an infinite impulse response filter, and the coefficients thereof may be based on the second coordinates not being within the first or second threshold windows 54, 56, or based upon the distance between the second coordinates 60(3) and the first coordinates 60.

The update is to move the location of the central point 52 of the second threshold window 56, while keeping the size of the threshold window the same. The new location of the central point 52 of the second threshold window 56 is moved such that the second coordinate 60(3) is immediately adjacent to, but not inside of, the second threshold window 56, or in some cases, such that the second coordinate 60(3) is a portion of the perimeter of the second threshold window 56 as moved or adjusted. The update is also to move the location of the central point 51 of the first threshold window 54, while keeping the size of the first threshold window 54 the same. Also, in this scenario, the first threshold window 54 and second threshold window 56 have perimeters that overlap in part.

The infinite impulse response filters described above can be calculated as:

$$z(t)=((x(t)*w0)+(z(t-1)*w1))/(w0+w1)$$

where $z(t)$ is the filtered coordinate to be reported, $x(t)$ is the coordinate 60(1), 60(2), 60(3) calculated from the touch data. $Z(t-1)$ is previous filtered coordinate if coordinate is outside of the second threshold window 56, or is the center point 52 of the second threshold window 56 if the previous filtered coordinate is within the second threshold window 56. $w0$, and $w1$ are dynamic weights calculated based on the speed of the coordinate. If $w0 \ll w1$, the coordinate $z(t)$ is filtered heavily and tends to remain close to $z(t-1)$.

Figure 7:
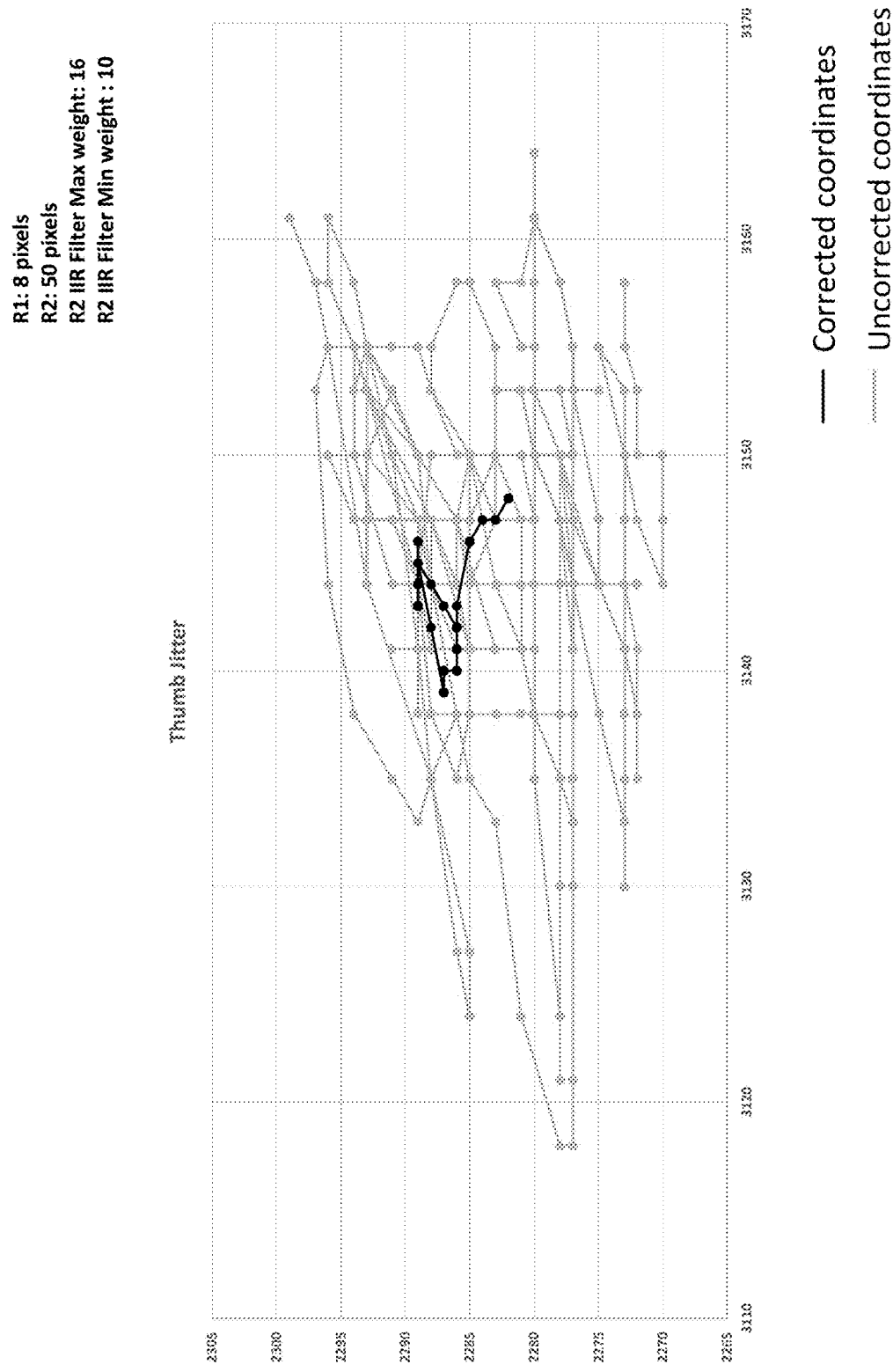
FIG. 7 is a graph showing uncorrected coordinates, and the correction to those coordinates using the methods and techniques described herein, for a long touch.

The robust results provided by these techniques can be seen in FIG. 7, for example. Here, the large amount of coordinate jitter can be seen in the uncorrected coordinates. However, the corrected coordinates show the coordinate jitter as being heavily constrained, providing for more accurate coordinate determination and a better user experience.

It should be understood that the techniques described above may be applied continuously, and that the thresholds and coordinate may be continually updated using such techniques.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

The invention claimed is:

1. A touch screen controller operable with a touch screen, the touch screen controller comprising:
   input circuitry configured to receive touch data from the touch screen;
   processing circuitry configured to:
      determine first coordinates of a single touch to the touch screen at a first time, based upon the received touch data;
      set a first threshold window about the first coordinates, the first threshold window encompassing the first coordinates while having a central point at the first coordinates and a radius greater than that of the first coordinates;
      set a second threshold window about the first coordinates, the second threshold window having a central point at the first coordinates and being larger than the first threshold window; and
      determine second coordinates of the single touch at a second time, based upon the received touch data;
   where the second coordinates are not within the first threshold window but are within the second threshold window, use a filter function to change the second coordinates, the filter function having coefficients that are based upon a distance between the second coordinates and the central point of the second threshold window; and wherein the change of the second coordinates using the filter function serves to compensate for coordinate jitter between the first and second coordinates.

2. The touch screen controller of claim 1, wherein the processing circuitry is further configured to, where the second coordinates are within the first threshold window, change the second coordinates based upon a distance between the second coordinates and the central point of the first threshold window.

3. The touch screen controller of claim 1, wherein the processing circuitry is further configured to, where the second coordinates are not within the first threshold window but are within the second threshold window, update the first threshold window as a function of the second coordinates.

4. The touch screen controller of claim 3, wherein the processing circuitry updates the first threshold window by moving a location of the central point of the first threshold window as a function of the second coordinates.

5. The touch screen controller of claim 4, wherein the processing circuitry moves the location of the central point of the first threshold window by setting the location of the central point of the first threshold window such that the second coordinates are outside of, but immediately adjacent to, the first threshold window after moving of the central point thereof.

6. The touch screen controller of claim 4, wherein the processing circuitry moves the location of the central point of the first threshold window by setting the location of the central point of the first threshold window such that the second coordinates are at a perimeter of the first threshold window after moving of the central point thereof.

7. The touch screen controller of claim 4, wherein the processing circuitry updates the first threshold window without changing a size thereof.

8. The touch screen controller of claim 1, wherein the processing circuitry is further configured to, where the second coordinates are not within the first threshold window and not within the second threshold window, change the second coordinates based upon a distance between the second coordinates and the first coordinates.

9. The touch screen controller of claim 1, wherein the processing circuitry is further configured to, where the second coordinates are not within the first threshold window and not within the second threshold window, change the second coordinates based upon a distance between the second coordinates and the first coordinates divided by an elapsed time between the first time and the second time.

10. The touch screen controller of claim 1, wherein the processing circuitry is further configured to, where the second coordinates are not within the first threshold window and not within the second threshold window, update the second threshold window as a function of the second coordinates.

11. The touch screen controller of claim 10, wherein the processing circuitry updates the second threshold window by moving a location of the central point of the second threshold window as a function of the second coordinates.

12. The touch screen controller of claim 11, wherein the processing circuitry moves the location of the central point of the second threshold window by setting the location of the central point of the second threshold window such that the second coordinates are outside of, but immediately adjacent to, the second threshold window after moving of the central point thereof.

13. The touch screen controller of claim 11, wherein the processing circuitry moves the location of the central point of the second threshold window by setting the location of the central point of the second threshold window such that the second coordinates are at a perimeter of the second threshold window after moving of the central point thereof.

14. The touch screen controller of claim 10, wherein the processing circuitry updates the second threshold window without changing a size thereof.

15. The touch screen controller of claim 1, wherein the processing circuitry is further configured to, where the second coordinates are within the first threshold window, change the second coordinates to match the central point of the first threshold window.

16. A method, comprising:
receiving touch data from a touch screen;
determining first coordinates of a single touch to the touch screen at a first time based upon the received touch data;
setting a first threshold window about the first coordinates, the first threshold window encompassing the first coordinates while having a central point at the first coordinates and a radius greater than that of the first coordinates;
setting a second threshold window about the first coordinates, the second threshold window having a central point at the first coordinates and being larger than the first threshold window; and
determining second coordinates of the single touch at a second time based upon the received touch data;
where the second coordinates are not within the first threshold window but are within the second threshold window, using a filter function to change the second coordinates, the filter function having coefficients that are based upon a distance between the second coordinates and the central point of the second threshold window; and
wherein the change of the second coordinates using the filter function serves to compensate for coordinate jitter between the first and second coordinates.

17. The method of claim 16, further comprising, where the second coordinates are within the first threshold window, changing the second coordinates based upon a distance between the second coordinates and the central point of the first threshold window.

18. The method of claim 16, further comprising, where the second coordinates are not within the first threshold window but are within the second threshold window, updating the first threshold window as a function of the second coordinates.

19. The method of claim 18, wherein the first threshold window is updated by moving a location of the central point of the first threshold window as a function of the second coordinates.

20. The method of claim 19, wherein the location of the central point of the first threshold window is moved by setting the location of the central point of the first threshold window such that the second coordinates are outside of, but immediately adjacent to, the first threshold window after moving of the central point thereof.

21. The method of claim 19, wherein the location of the central point of the first threshold window is moved by setting the location of the central point of the first threshold window such that the second coordinates are at a perimeter of the first threshold window after moving of the central point thereof.

22. The method of claim 16, further comprising, where the second coordinates are not within the first threshold window and not within the second threshold window, changing the second coordinates based upon a distance between the second coordinates and the first coordinates.

23. The method of claim 16, wherein the filter function is an infinite impulse response filter that calculates the changed second coordinates as:

$$z(t)=((x(t)*w0)+(z(t-1)*w1))/(w0+w1)$$

wherein z(t) is the changed second coordinates as calculated by the filter, x(t) is the determined second coordinates at the second time, z(t−1) is the central point of the second threshold window, and w0 and w1 are dynamic weights dependent on a speed of movement to the determined second coordinates at the second time, the speed being based upon a distance between the determined first coordinates at the first time and the determined second coordinates at the second time.

24. The touch screen controller of claim 1, wherein the filter function is an infinite impulse response filter that calculates the second coordinates as:

$$z(t)=((x(t)*w0)+(z(t-1)*w1))/(w0+w1)$$

wherein z(t) is the changed second coordinates as calculated by the filter, x(t) is the determined second coordinates at the second time, z(t−1) is the central point of the second threshold window, and w0 and w1 are dynamic weights dependent on a speed of movement to the determined second coordinates at the second time, the speed being based upon a distance between the determined first coordinates at the first time and the determined second coordinates at the second time.

\* \* \* \* \*